(12) United States Patent
Zhao et al.

(10) Patent No.: US 10,924,149 B2
(45) Date of Patent: Feb. 16, 2021

(54) UNDERGROUND BASE STATION

(71) Applicant: Telefonaktiebolaget LM Ericsson (publ), Stockholm (SE)

(72) Inventors: Jie Zhao, Beijing (CN); Jianmin Kou, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 95 days.

(21) Appl. No.: 16/341,217

(22) PCT Filed: Nov. 22, 2016

(86) PCT No.: PCT/CN2016/106753
§ 371 (c)(1),
(2) Date: Apr. 11, 2019

(87) PCT Pub. No.: WO2018/094555
PCT Pub. Date: May 31, 2018

(65) Prior Publication Data
US 2019/0260412 A1  Aug. 22, 2019

(51) Int. Cl.
*H04B 1/00* (2006.01)
*H04B 1/3888* (2015.01)
(Continued)

(52) U.S. Cl.
CPC ............ *H04B 1/3888* (2013.01); *H01Q 1/04* (2013.01); *H01Q 1/1207* (2013.01); *H04W 88/08* (2013.01); *H04B 2001/3894* (2013.01)

(58) Field of Classification Search
CPC .......... H04B 1/3888; H04B 2001/3894; H01Q 1/04; H01Q 1/1207; H04W 88/08
See application file for complete search history.

(56) References Cited

U.S. PATENT DOCUMENTS 6,119,535 A * 9/2000 Tambo ................... G08B 21/10
73/865.8
2004/0048596 A1* 3/2004 Wyrzykowska ...... H04W 92/02
455/403

(Continued)

FOREIGN PATENT DOCUMENTS

| CN | 101175260 A | 5/2008 |
| CN | 103414276 A | 11/2013 |
| WO | 2010063328 A1 | 6/2010 |

OTHER PUBLICATIONS

International Search Report and Written Opinion for International Patent Application No. PCT/CN2016/106753, dated Jun. 29, 2017, 10 pages.

*Primary Examiner* — Pete T Lee
(74) *Attorney, Agent, or Firm* — Patent Portfolio Builders, PLLC

(57) ABSTRACT

The present disclosure provides an underground base station configured to locate below a ground surface of the earth. It includes an outer shell assembly, configured to have a cavity therein; a sealing assembly, arranged to be housed within the cavity and provided with at least one communication component therein; a fiber assembly, disposed to fix onto the outer shell assembly and a fiber from which is connected with the at least one communication component; and a cover assembly, fixed on top of the outer shell assembly and having an antenna module therein. The sealing assembly is configured to have at least one opening facing away from the ground surface.

16 Claims, 8 Drawing Sheets

(51) Int. Cl.
*H01Q 1/04* (2006.01)
*H01Q 1/12* (2006.01)
*H04W 88/08* (2009.01)
*H04B 1/38* (2015.01)

(56) References Cited

U.S. PATENT DOCUMENTS

| | | | |
|---|---|---|---|
| 2006/0274493 A1* | 12/2006 | Richardson | H05K 5/068 |
| | | | 361/679.4 |
| 2011/0199227 A1 | 8/2011 | Volanthen et al. | |
| 2015/0116931 A1 | 4/2015 | Simonsson | |

* cited by examiner

UNDERGROUND BASE STATION

This application is a 35 U.S.C. § 371 national phase filing of International Application No. PCT/CN2016/106753, filed Nov. 22, 2016, the disclosure of which is incorporated herein by reference in its entirety.

TECHNICAL FIELD

The present disclosure generally relates to a technical field of wireless communications, and more particularly to an underground base station.

BACKGROUND

Currently, people give more and more attention to dwelling environment, especially whether there are some devices generating radiation or not. Due to this, they tend to complain an antenna of a base station which will trigger radiation, and thus would be reluctant to see any base station in their home district.

SUMMARY

In view of the foregoing, an object of the present disclosure is to overcome or at least mitigate at least one of above shortcomings in the prior art solution. Herein, the present disclosure proposes out an underground base station. This underground base station is installed underground, for example into an underground equipment well, which can at least solve one of the following problems of water intrusion, an installation position, signal strength, and heat dissipation.

In accordance with one aspect of the present application, it provides an underground base station configured to locate below a ground surface of the earth, comprising:

an outer shell assembly, configured to have a cavity therein;

a sealing assembly, arranged to be housed within the cavity and provided with at least one communication component therein;

a fiber assembly, disposed to fix onto the outer shell assembly and a fiber from which is connected with the at least one communication component; and a cover assembly, fixed on top of the outer shell assembly and having an antenna module therein;

wherein the sealing assembly is configured to have at least one opening facing away from the ground surface.

BRIEF DESCRIPTION OF THE DRAWINGS

These aspects and/or other aspects as well as advantages of the present application will become obvious and readily understood from the description of the preferred embodiments of the present application in conjunction with the accompanying drawings below, in which.

DETAILED DESCRIPTION OF EMBODIMENTS

Figure 1:
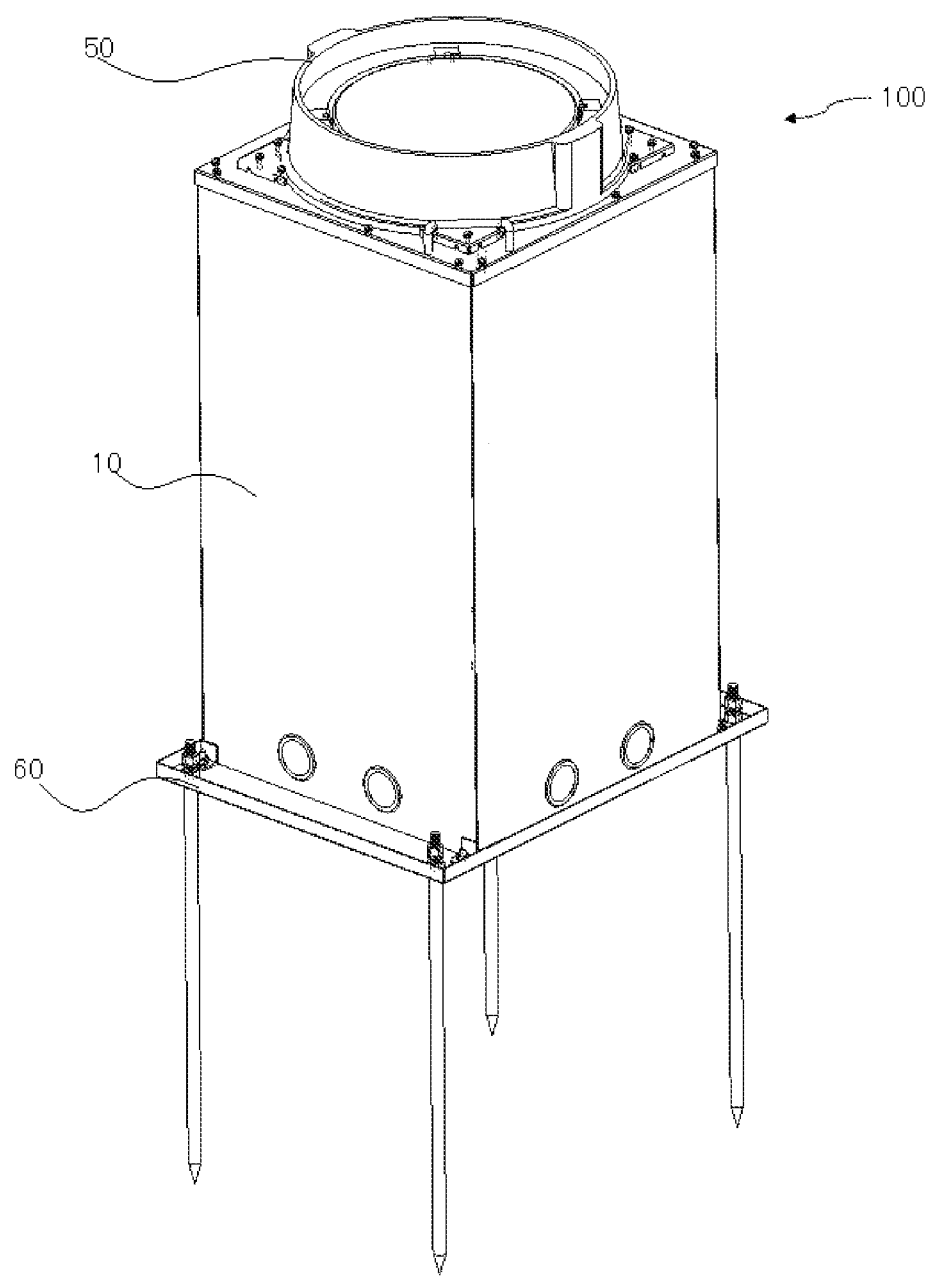
FIG. 1 is a schematic view of an underground base station after being completely assembled, in accordance with an embodiment of the present application.

In the discussion that follows, specific details of particular embodiments of the present techniques are set forth for purposes of explanation and not limitation. It will be appreciated by those skilled in the art that other embodiments may be employed apart from these specific details.

Furthermore, in some instances detailed descriptions of well-known methods, structures, and devices are omitted so as not to obscure the description with unnecessary detail.

As discussed in the background, if the base station used above the earth is directly installed underground, for example being installed into the equipment well, it will at least lead to some adverse factors, such as water intrusion, no appropriate installation position, weakness of signal strength, or bad heat dissipation. Due to these factors, once the existing base station is installed underground, it will not operate normally or even result in malfunction.

In the present application, an underground base station is proposed out, which can provide at least one of water protection and communication protection, when it is installed or buried into the earth.

With reference to FIGS. 1-4, an embodiment of the present application provides an underground base station 100. Specifically, the underground base station 100 is buried into the earth, i.e., to locate below a ground surface 201 of the earth (shown in FIG. 7). It includes an outer shell assembly 10, a sealing assembly 20, a fiber assembly 30, and a cover assembly 40. In one example, a top cover 50 is provided to cover the cover assembly 40 and thus to protect it. Alternatively, the top cover 50 can be replaced by a manhole cover or the like.

Figure 7:
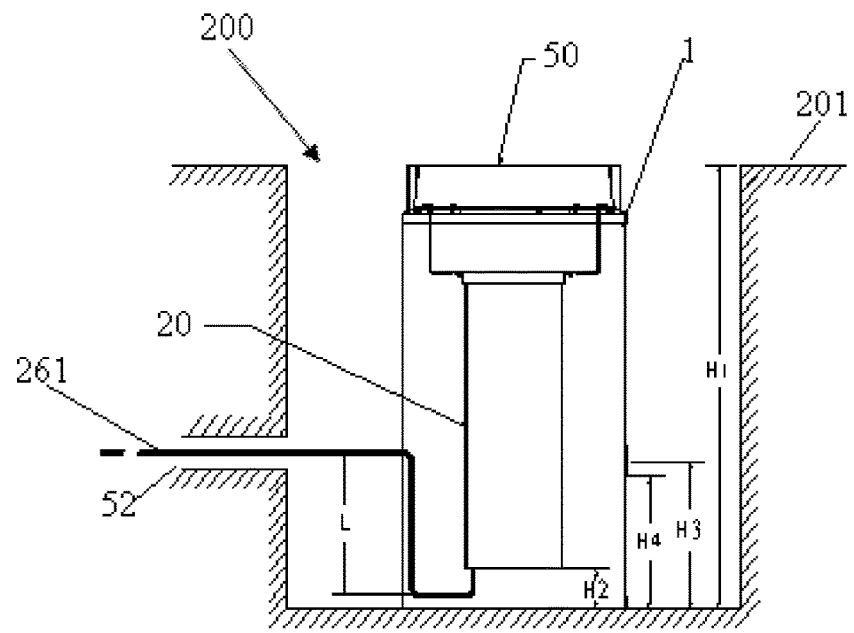
FIG. 7 is a schematic view for showing an arrangement when the underground base station is assembled into an equipment well.
Figure 8:
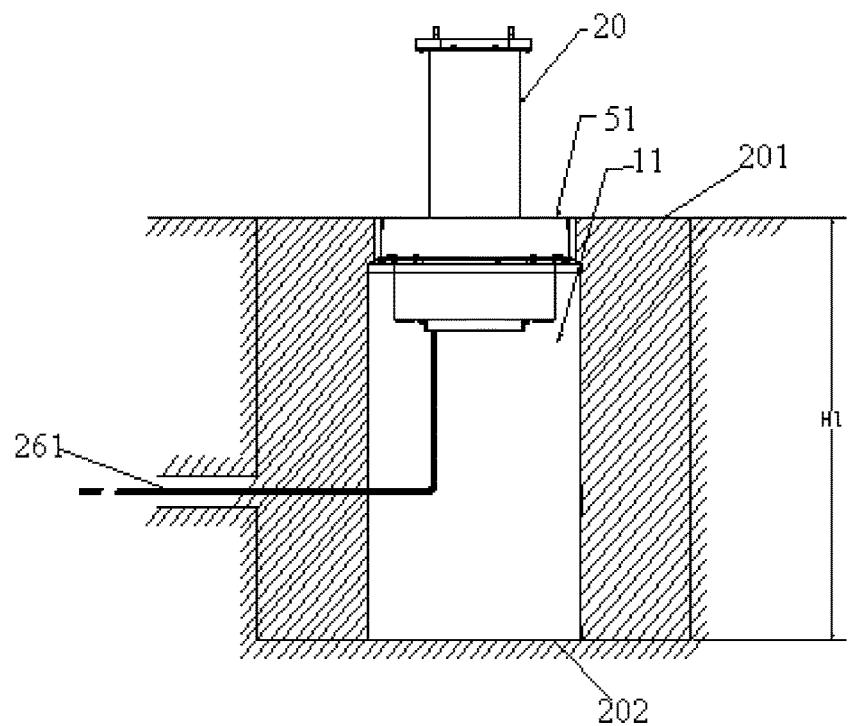
FIG. 8 is a schematic view for showing the arrangement of FIG. 7 when the sealing assembly is drawn out from an outer shell of the underground base station.
Figure 9:
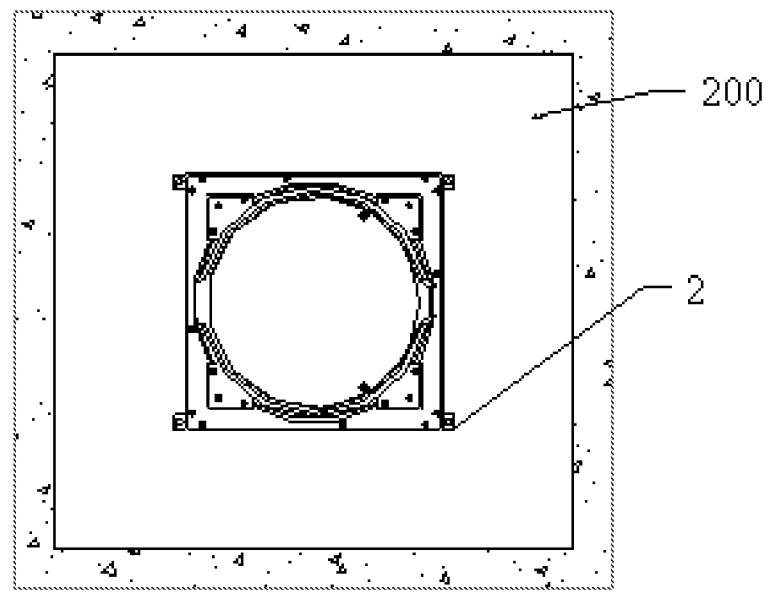
FIG. 9 is a top view of the arrangement as shown in FIG. 7.

In the present embodiment, the underground base station 100 further includes a ground assembly 60, by which four corners 2 of the outer shell assembly 10 are fixed at a bottom surface 202 of an equipment well 200 excavated in the earth, as shown in FIGS. 7-9. Illustratively, the four corners 2 are fixed with the grounding assembly 60 by screws.

Figure 2:
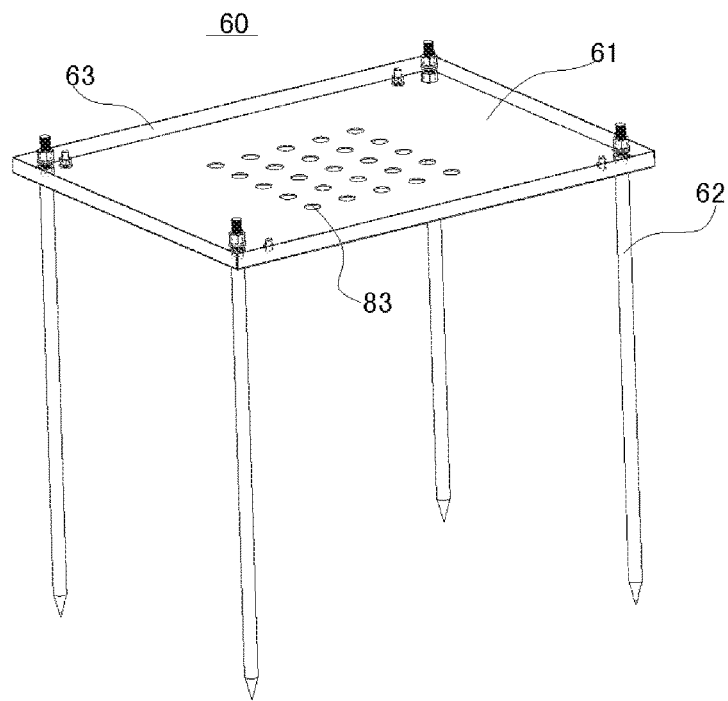
FIG. 2 is a schematic view of a grounding assembly of the underground base station as shown in FIG. 1.
Figure 3:
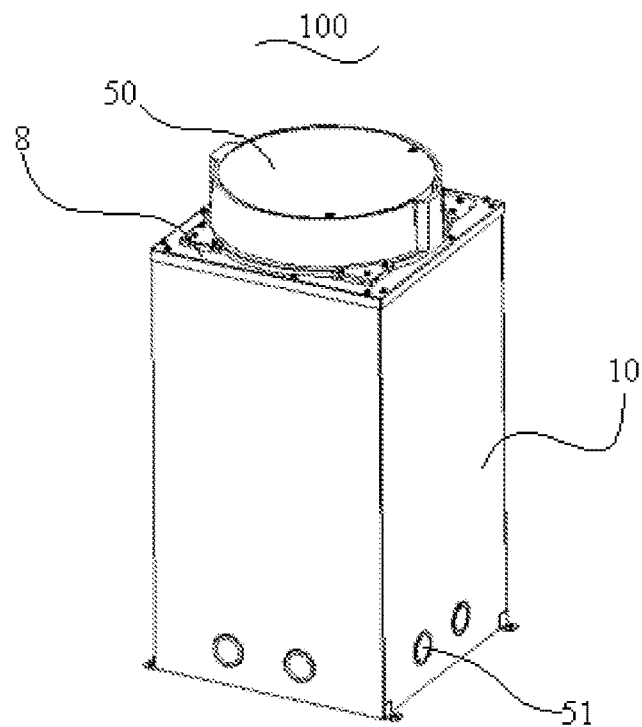
FIG. 3 is a schematic view of the underground base station as shown in FIG. 1 without the grounding assembly.
Figure 4:
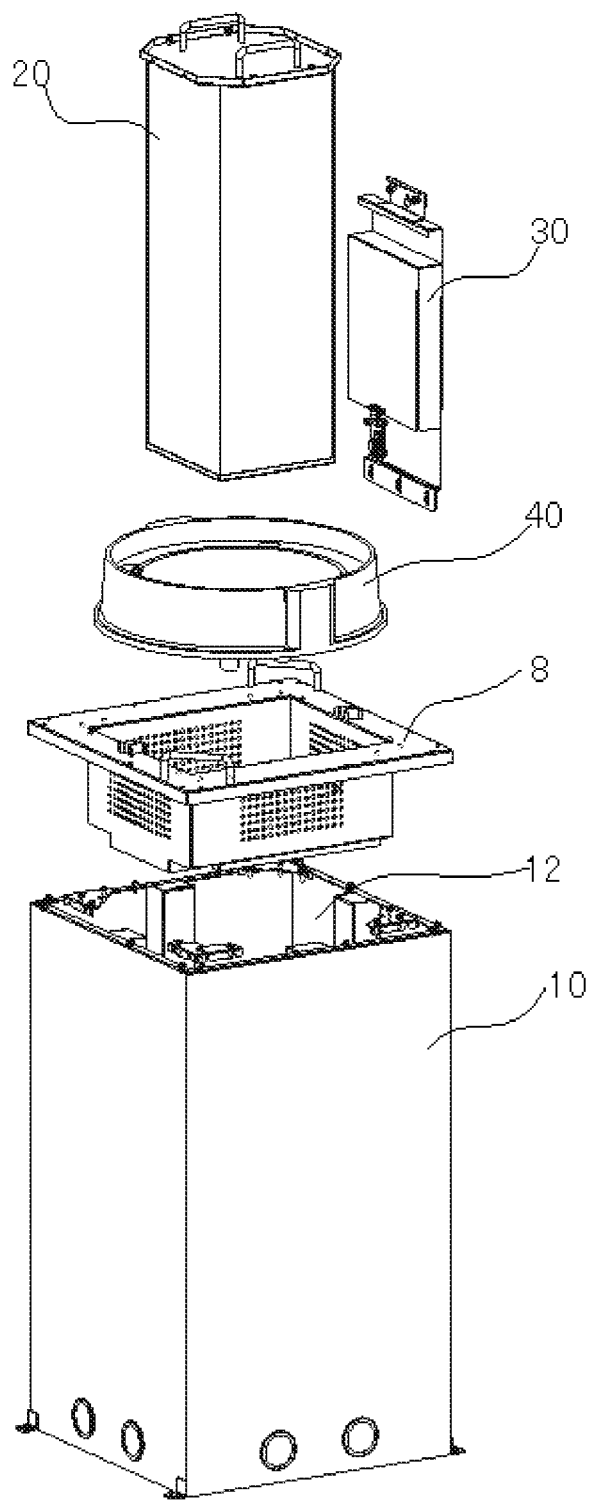
FIG. 4 is a decomposition view for schematically showing a structure of the underground base station as shown in FIG. 3.

Back referring to FIG. 2, the grounding assembly 60 includes a flat plate 61 and at least one grounding needle 62 installed thereon. Further, the flat plate 61 is provided with at least one hole 83 at a main surface thereof and with a flange 63 at a periphery thereof. In this example, four grounding needles 62 are provided at each corner 2 and a plurality of the holes 83 are provided for water drainage. The flange 63 is beneficial to position the outer shell assembly 10 during installation.

Figure 5:
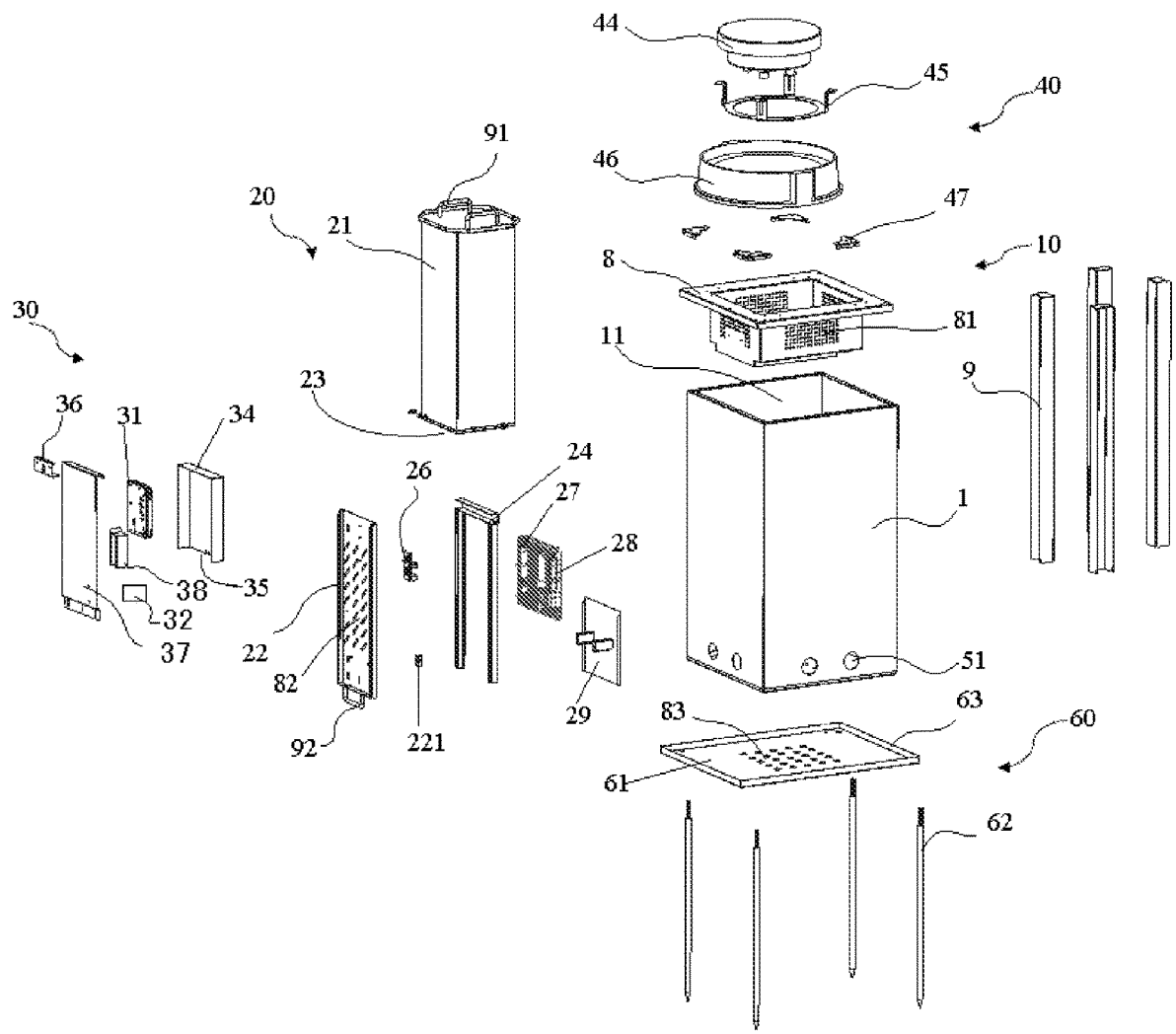
FIG. 5 is an exploded view for schematically showing details of various components of the underground base station as shown in FIG. 1.

In combination with FIG. 5, the outer shell assembly 10 is provided to have a cavity 11 therein. The sealing assembly 20 is arranged to be housed within the cavity 11 and provided with at least one communication component 26, 27, 28 therein. The fiber assembly 30 is disposed to fix onto a lateral inner surface 12 (shown in FIG. 4) of the outer shell assembly 10 and provided with a fiber 33 (shown in FIG. 10) for connecting the fiber assembly 30 with the at least one communication component 26, 27, 28. The cover assembly 40 is fixed on top of the outer shell assembly 10 and having an antenna module 44 therein. Specifically, the sealing assembly 20 is configured to have at least one opening 23 facing away from the ground surface 201. In this way, it can provide at least one of water protection and communication protection.

It should be noted that the sealing assembly 20 having the opening 23 in fact is one kind of sealing structures. When the opening 23 is immersed into liquid for example water, it can function like a bowl which is placed upside down. Because an inner chamber of the sealing assembly 20 is filled with air, it can form a sealing space within the inner chamber when it is surrounded by water, so as to produce the waterproof effect. The necessary communication components are disposed within the inner chamber of the sealing assembly 20, and thus it can protect these communication components from water intrusion and ensure them to operate appropriately. Furthermore, the water surrounds the outside of the sealing assembly 20, and at this time can perform water cooling. In another situation, when the sealing assembly 20 is not immersed by water or there is no water intruding into the underground base station 100, the opening 23 can ensure to perform natural heat dissipation by an air flow.

The cover assembly 40 includes the antenna module 44 provided with a radiation system (inside the antenna module), a dampening and horizontal adjustment element 45 and a top frame 46 arranged from top to bottom and assembled together. In this example, the antenna module 44 is covered by the top cover 50. Specifically, the dampening and horizontal adjustment element 45 and the top frame 46 are fixed onto a top side of the outer shell assembly 10 by a tightening element 47 after inserting the sealing assembly 20 into the cavity 11. As shown, the tightening element 47 is composed by four triangular clips, but it can be known that the tightening element 47 can be replaced by other similar fixing devices known in the art. In this example, the shapes of the antenna module 44, the dampening and horizontal adjustment element 45 and the top frame 46 are circular or annular. Of course, they can have any other suitable shapes.

The outer shell assembly 10 includes a rectangular outer shell 1 and a supporting assembly 8, 9 provided inside or at an upper side of the outer shell 1, and the sealing assembly 20 is fixed with the outer shell 1 by means of the supporting assembly 8, 9. In this example, the supporting assembly 8, 9 can be provided with a flange at both its upper part and lower part (specifically, of the frame body 8 described later). The sealing assembly 20 is supported by the flange at the lower part and then fixed with the supporting assembly 8, 9 by for example screws. With such fixation, if at least a part of the sealing assembly 20 is immersed by water, it can prevent it moving upwardly due to the buoyant force generated in the water.

In one example, the supporting assembly 8, 9 includes a frame body 8, at least one lateral surface of which is provided with at least one hole 81, and at least one supporting post 9 provided under the frame body 8. Specifically, the frame body 8 is shaped like a basket, and thus flanges at the upper part of the frame body 8 can be supported by the outer shell 1 and lower parts thereof is housed within the cavity 11. Four lateral surfaces of the lower parts are provided with holes 81, which can be used as an inlet for water from the ground surface 201 and as an outlet for air. This is beneficial for heat dissipation, which will be described later with reference to the following drawings. Each of the four supporting posts 9 has one end located under the frame body 8 and at each corner of the frame body 8 so as to prevent deformation thereof, and the other end is supported onto the grounding assembly 60 or a bottom plate of the outer shell 1 (if provided). In this example the sealing assembly 20 can be rest on the flange at the lower part of the frame body 8, which is provided at the periphery of the lower part of the frame body 8.

In combination with FIGS. 5 and 7, at least one first through hole 51 is provided on a lateral surface of the outer shell assembly 10, and at least one second through hole 52 is provided on a lateral surface of an equipment well 200 for housing the underground base station 100. In one example, the at least one first through hole 51 and the at least second through hole 52 correspond to each other, so as to facilitate the wiring, for example, to allow incoming and outgoing of an electrical cable 261 for power supply. Further, each lateral surface of the outer shell 1 is provided with two first through holes 51, and these first through holes 51 can not only allow passage of the electrical cable 261, but also can drain off for example rain water entering from the gap between the top cover 50 and its surrounding earth. Therefore, a height H4 (shown in FIG. 7) of water pre-stored or stored within the outer shell 51 depends on the height of the first through holes 51. Of course, it is also possible to arrange two second through holes 52 on each of the lateral surface of the equipment well 200. It should be noted that the first through hole 51 and the second through hole 52 are not limited herein, and thus the number and the arrangement thereof can be provided according to actual requirement.

Figure 6:
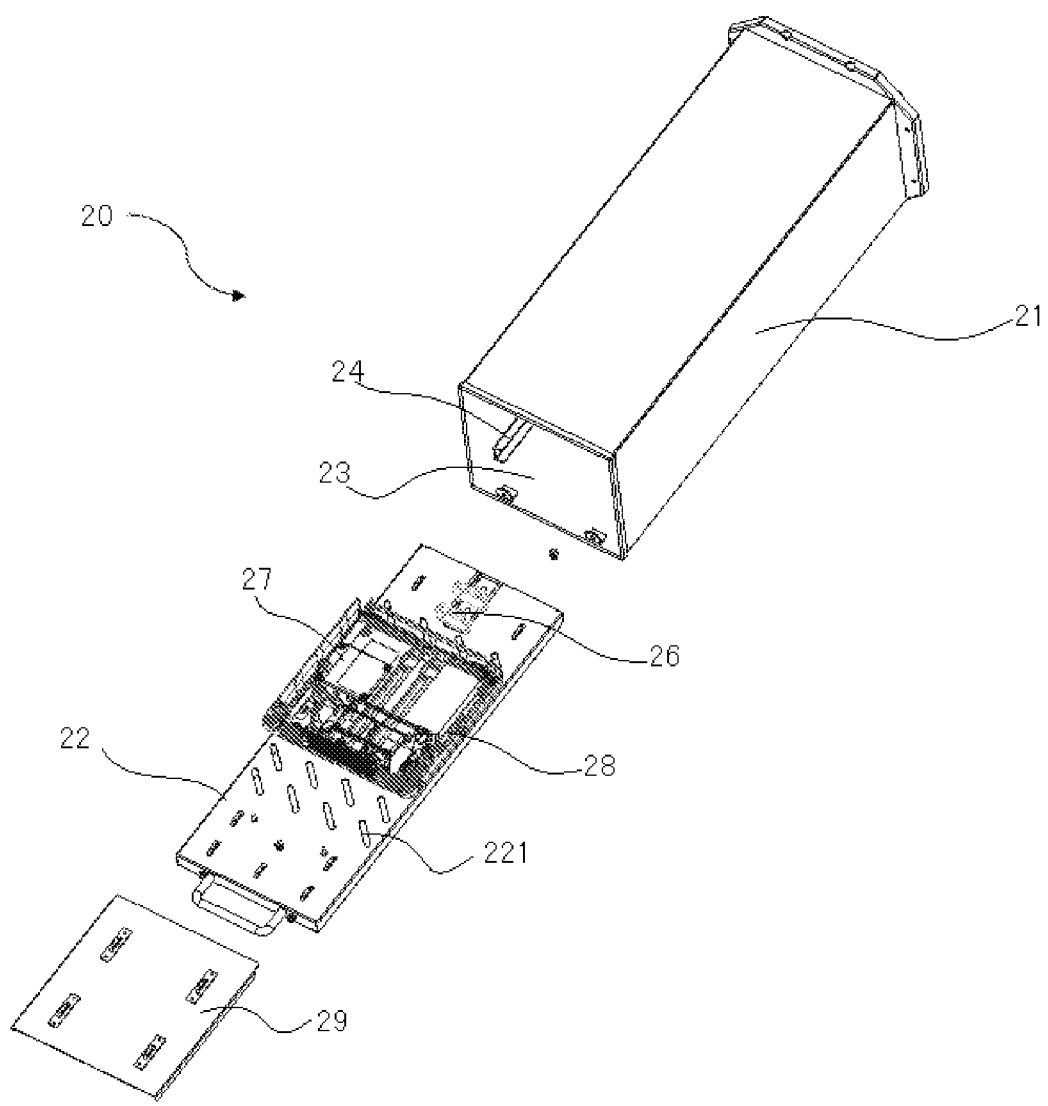
FIG. 6 is a decomposition view for schematically showing details of a sealing assembly as shown in FIG. 4.

As shown in FIGS. 5 and 6, the sealing assembly 20 includes a sealing shell 21 and an installation plate 22 on which the at least one communication component 26, 27, 28 is installed. The sealing shell 21 is substantially box-shaped, the opening 23 is provided at a bottom side of the sealing shell 21, and at least one handle 91 is provided at a top surface of the sealing shell 21. A guide rail assembly 24 is provided within the sealing shell 21 and the installation plate 22 is inserted into the sealing shell 21 by the guide rail assembly 24 and then fixed onto the sealing shell 21 by for example screws. In this example, two handles 91 are provided on the top surface of the sealing shell 21.

It should be noted that in the example as shown, only one opening 23 is provided, not only to generate the waterproof effect (if necessary), but also to install necessary components into the sealing assembly 20. Of course, the number of the opening 23 is not limited herein, and thus the person skilled in the art can select it according to the actual needs. For example, if the necessary components are placed into the sealing shell 21 in advance and the sealing shell 21 is sealed by the known methods in the art, then a plurality of openings 23 can be arranged on the bottom surface or the bottom plate of the sealing assembly 20. Alternatively, the person skilled in the art can also design the sealing assembly 20 without any opening 23, as long as it can adopt the principle of waterproof as described herein.

Further referring to FIGS. 5-7 and 10, the at least one communication component 26, 27, 28 includes a circuit breaker 26, a PSU (power supply unit) 27 and a RRU (radio remote unit) 28. The circuit breaker 26 is connected with the electrical cable 261 at one end thereof and with the PSU 27 at the other end thereof respectively. The PSU 27 is connected with the RRU 28 which is in turn connected with the radiation system of the antenna module 40 by a jumper wire 25. Herein, the RRU 28 is sealed with glue or a gasket. Further, the PSU 27 and the RRU 28 are installed together by means of a wind guide plate 29, and the installation plate 22 is provided with at least one second hole 82 and/or at least one additional handle 92. In this example, a GND connection element 221 is provided at the bottom side of the installation plate 22. This GND connection element 221 is connected to the ground by means of a GND wire 4 and the grounding needles 62.

The fiber assembly 30 includes a fiber box 31 and a fiber fixing plate 32, which are fixed on a fiber assembly installation plate 37, and the fiber assembly installation plate 37 is fixed onto the lateral inner surface 12 of the outer shell assembly 10. The fiber box 31 is used to wind up the fiber 33, and the fiber fixing plate 32 is used to fix the fiber 33 drawn from the fiber box 31. A supporting element 38 is provided below the fiber box 31. A fiber box cover 34 is provided for covering the fiber box 31 so that the fiber box 31 and the fiber box cover 34 together constitute a sealing body with only one aperture 35 facing away from the ground surface 201. A fixing element 36 is provided on top of the fiber assembly 30 for fixing onto the outer shell assembly 10.

In one example, the underground base station 100 can be designed to be a mini underground base station.

Next, an installation procedure of the underground base station 100 is described in detail with reference to FIGS. 7 and 8.

The equipment well 200 is dug out in advance. The underground base station 100 can be pre-assembled on the earth, and then are put and fixed into the equipment well 200. Finally, the equipment well 200 is backfilled with soil or cement concrete, leaving the top cover 50 to be flush with the ground surface 201. When carrying out maintenance and repair of the various components (especially the communication components) in the underground base station 100, it is only needed to open the top cover 50 and draw out the sealing assembly 20 without second time construction. Therefore, with the present underground base station 100, it is easy to maintain it without substantial dismantling operation.

It should be noted that a size of the equipment well 200 is selected to be sufficient to accommodate the outer shell 1 and to fix the outer shell 1 with the bottom surface 202 of the equipment well 200. In one example, a height H1 of the equipment well 200 is chosen to be identical with that of the underground base station 100 (including the top cover 50).

After the four corners 2 of the equipment well 200 are fixed with the bottom surface 202 (as shown in FIG. 9), the electrical cable 261 passes through the second through hole 52 and the first through holes 51, and then enters the outer shell 1. In one example, a length L of the electrical cable 261 is reserved at the bottom of the outer shell 1. Specifically, L=1.5~2 H1, and thus it can ensure that the sealing assembly 20 can be drawn out from the position 51 where the top cover 50 is located, without dismantling the connection to the electrical cable 261. This is because the reserved electrical cable 261 is connected with relevant communication equipments for example the circuit breaker 26.

Please be noted that the definitions about reference numerals H1-H4 are specified as follows. H1 is a depth or height of the equipment well 200; H2 is a distance from the bottom surface 202 of the equipment well 200 to the bottom of the sealing assembly 20; H3 is a distance from the bottom surface 202 to the first through hole 51; and H4 is a height of water pre-stored within the outer shell 51 or at the bottom of the outer shell 51.

From the above, it can be apparent that the present underground base station 100 can be installed within a limiting underground space, and be easy to be assembled in situ. As compared with the base station used above the earth, it can hide the antenna or the antenna module, and reduce the installation area of the base station.

Figure 10:
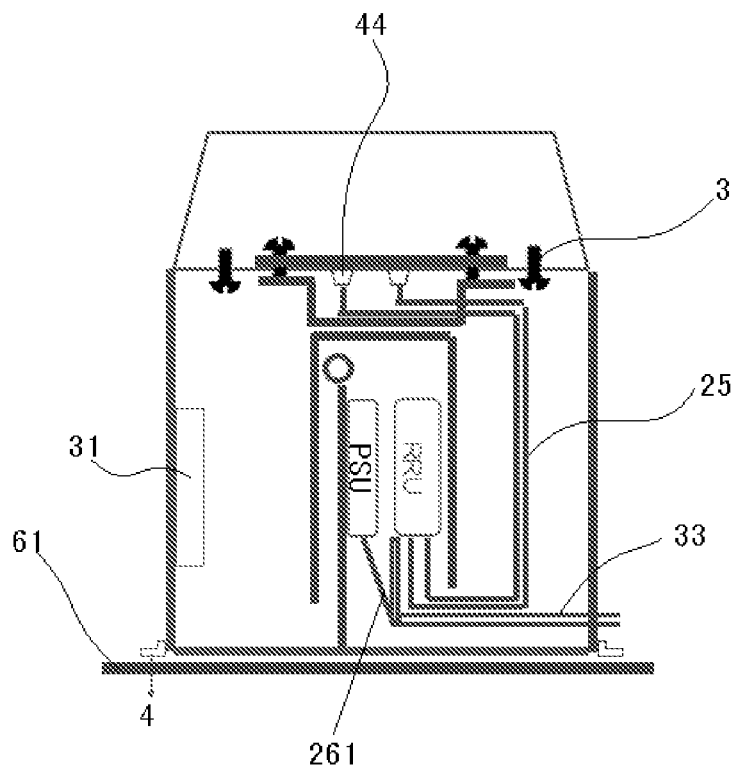
FIG. 10 is a schematic view for showing principle of the underground base station in accordance with an embodiment of the present application.

FIG. 10 shows out a view for showing the principle of the underground base station 100. In order to not obscure the description, some necessary parts of the underground base station 100 are omitted herein. It only shows the antenna module 44 is connected with the RRU 28 by means of the jumper wire 25, the RRU 28 is connected with the PSU 27 by means of the electrical cable 261, and the PSU is connected with the circuit breaker 26 via the electrical cable 261. The cover assembly 40 is fixed with the outer shell 1 by at least one guide pin 3. In the figure, it shows four guide pins 3 are used herein, but it should be noted that the number of the guide pin 3 is not limited herein. In addition, several GND wires 4 are provided at the corners 2 of the outer shell 1. The outer shell 1 is fixed onto the flat plate 61.

Figure 11:
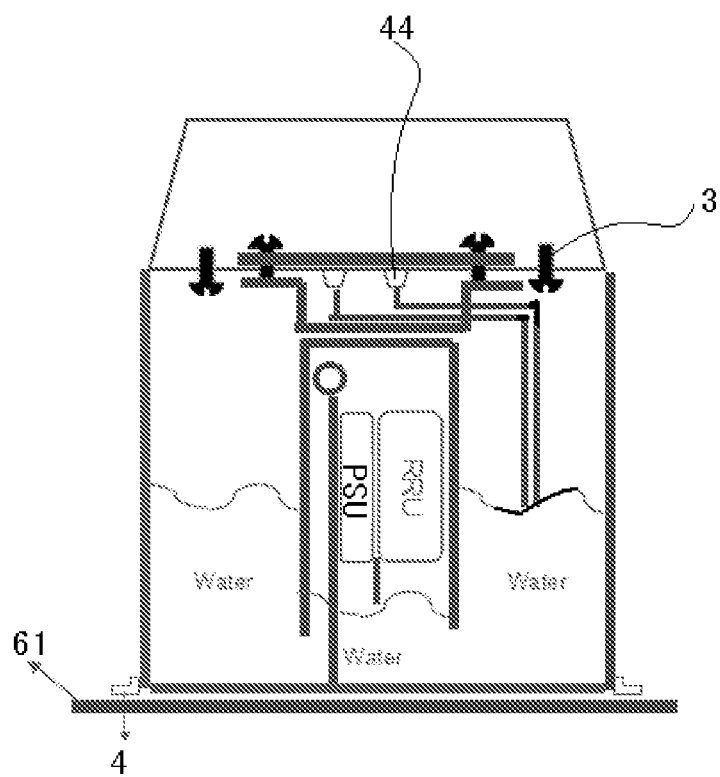
FIG. 11 is a schematic view for showing how the underground base station provides water protection and dissipates heat by water.

As discussed above and as shown in FIG. 11, the frame body 8 of the supporting assembly 8, 9 is provided with the plurality of holes 81 on the lateral surface thereof. When the water for example the rain water enters into the equipment well 200 and the opening 23 is immersed into the water (i.e., H4>H2), due to the air in the inner chamber of the sealing shell 21, the water cannot enter into the inner chamber of the sealing shell 21, so that the communication components 26, 27, 28 can be protected from water intrusion. Further, the surrounding water will take away the heat generated by the communication components 26, 27, 28. Therefore, it can achieve the water protection with high reliability, and simplify the water protection by using the sealing assembly 20. Alternatively, if some water (for example having a height of H4) is pre-stored at the bottom of the outer shell 1, it can also form the seal body as discussed above and dissipate heat by water.

In addition, for maintenance, it is only needed to draw out the sealing assembly 20 without any second time water protection.

Figure 12:
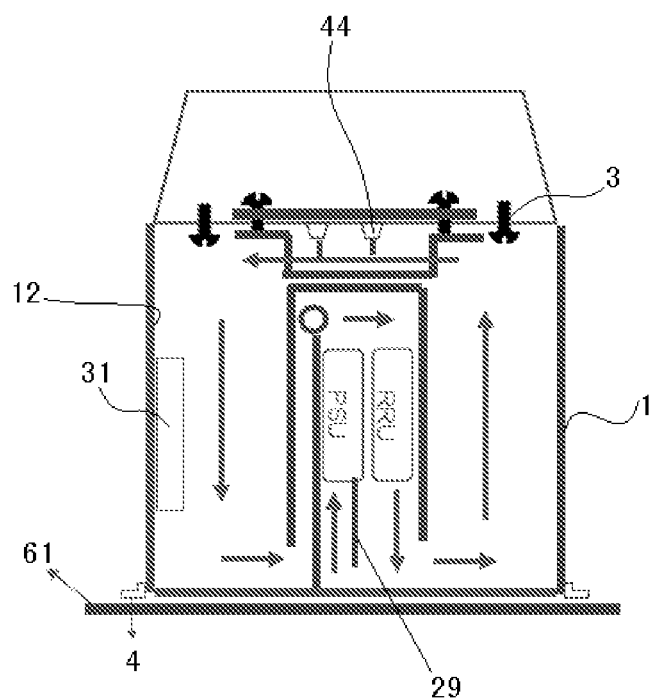
FIG. 12 is a schematic view for showing how the underground base station dissipates heat by air.

As discussed above and as shown in FIG. 12, when there is no water present in the outer shell 1 or the opening 23 is not immersed by water (i.e., the height of the water present at the bottom of the outer shell 1 is lower than H2), the air flow (as shown by arrows therein) in the outer shell 1 will take away the heat generated by the communication components 26, 27, 28, since the frame body 8 is provided with holes 81, and the wind guide plate 29 is used to pass the air flow. It can be seen that such cooling solution can realize at least one of the water cooling and nature cooling, according to the actual conditions in the outer shell 1.

It should be understood that the water cooling or the nature cooling can be selected according to the amount of the heat generated by the communication component in the sealing assembly 20. For example, if there is a relatively large amount of heat generated, the water can be pre-stored into the equipment well 200 and the water cooling will be performed or generated. Alternatively, if there is a relative small amount of heat generated, the water is not pre-filled or used, and the nature cooling is performed by the air flow.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. An underground base station configured to locate below a ground surface of the earth, the underground base station comprising:
    an outer shell assembly, configured to have a cavity therein;
    a sealing assembly, arranged to be housed within the cavity and provided with at least one communication component therein;
    a fiber assembly, disposed to fix onto the outer shell assembly and a fiber for connecting the fiber assembly with the at least one communication component; and a cover assembly, fixed on top of the outer shell assembly and having an antenna module therein,
    wherein the sealing assembly is configured to have at least one opening facing away from the ground surface.

2. The underground base station according to claim 1, wherein the sealing assembly comprises a sealing shell and an installation plate, and wherein the at least one communication component is installed on the installation plate.

3. The underground base station according to claim 2, wherein the sealing shell is substantially box-shaped, and the at least one opening is provided at a bottom side of the sealing shell.

4. The underground base station according to claim 2, wherein the at least one communication component comprises a circuit breaker, a power supply unit (PSU), and a radio remote unit (RRU) connected in a sequence, and wherein the PSU and the RRU are installed together by means of a wind guide plate.

5. The underground base station according to claim 2, wherein a guide rail assembly is provided within the sealing shell, and the installation plate is inserted into the sealing shell by the guide rail assembly and then fixed onto the sealing shell.

6. The underground base station according to claim 1, wherein the cover assembly comprises the antenna module provided with a radiation system, a dampening and horizontal adjustment element, and a top frame arranged from top to bottom and assembled together.

7. The underground base station according to claim 6, wherein the antenna module is covered by a top cover.

8. The underground base station according to claim 6, wherein the dampening and horizontal adjustment element and the top frame are fixed onto a top side of the outer shell assembly by a tightening element after inserting the sealing assembly into the cavity.

9. The underground base station according to claim 1, wherein the outer shell assembly comprises a rectangular outer shell and a supporting assembly provided at an upper side of the rectangular outer shell, and wherein the sealing assembly is fixed with the rectangular outer shell by means of the supporting assembly.

10. The underground base station according to claim 9, wherein the supporting assembly comprises a frame body, and wherein at least one lateral surface of the frame body is provided with at least one hole, and at least one supporting post provided under the frame body.

11. The underground base station according to claim 1, wherein at least one first through hole is provided on a lateral surface of the outer shell assembly, and at least one second through hole is provided on a lateral surface of an equipment well for housing the underground base station, and wherein the at least one first through hole and the at least one second through hole correspond to each other.

12. The underground base station according to claim 1, wherein the fiber assembly comprises a fiber box and a fiber fixing plate, and wherein the fiber box and the fiber fixing plate are fixed on a fiber assembly installation plate, and the fiber assembly installation plate is fixed onto a lateral inner surface of the outer shell assembly.

13. The underground base station according to claim 12, wherein a supporting element is provided below the fiber box; and
    a fixing element is provided on top of the fiber assembly for fixing onto the outer shell assembly.

14. The underground base station according to claim 13, wherein a fiber box cover is provided for covering the fiber box so that the fiber box and the fiber box cover together constitute a sealing body with only one aperture facing away from the ground surface.

15. The underground base station according to claim 1, wherein the underground base station further comprises a grounding assembly, the outer shell assembly has a cross-section of a rectangle, and wherein four corners of the outer shell assembly are fixed: at a bottom of an equipment well, or at the equipment well by the grounding assembly.

16. The underground base station according to claim 15, wherein the grounding assembly comprises a flat plate and at least one grounding needle installed thereon.

* * * * *